United States Patent [19]

Stutz

[11] Patent Number: 4,549,268

[45] Date of Patent: Oct. 22, 1985

[54] APPARATUS FOR MEASURING THE LENGTH OF FILAMENTARY MATERIAL, SUCH AS YARN OR THREAD WOUND-UP AT INDIVIDUAL WINDING OR SPINNING LOCATIONS OF A TEXTILE MACHINE

[75] Inventor: Hansruedi Stutz, Dietlikon, Switzerland

[73] Assignee: Loepfe Brothers Limited, Wetzikon, Switzerland

[21] Appl. No.: 520,700

[22] Filed: Aug. 5, 1983

[30] Foreign Application Priority Data

Aug. 18, 1982 [CH] Switzerland ............... 4934/82

[51] Int. Cl.$^4$ ............... G06F 15/46; G06M 3/02
[52] U.S. Cl. ............... 364/470; 66/1 R; 364/562; 377/16; 377/24
[58] Field of Search ............... 364/470, 560, 562; 377/15, 16, 19, 20, 24; 73/159, 160; 66/209, 210, 1 R

[56] References Cited

U.S. PATENT DOCUMENTS

| 3,690,123 | 9/1972 | Delair et al. | 377/15 X |
| 3,721,809 | 3/1973 | Strandberg, Jr. et al. | 377/24 X |
| 3,858,415 | 1/1975 | Wilson et al. | 364/470 X |
| 3,961,500 | 6/1976 | Braley et al. | 364/470 X |
| 4,031,718 | 6/1977 | Luth | 364/470 X |
| 4,151,403 | 4/1979 | Woolston | 377/24 X |

*Primary Examiner*—Joseph Ruggiero
*Attorney, Agent, or Firm*—Werner W. Kleeman

[57] ABSTRACT

The apparatus for measuring the length of filamentary material, such as a yarn or thread, wound-up at individual ones of a number n of winding or spinning locations in a textile machine cooperates with an electronic scanning or interrogation device. The latter monitors the thread run at the aforementioned locations by means of a number n of scanning heads. The apparatus is constituted by a series circuit comprising a shift register including a number n of parallel outputs, a number n of storage members, a number n of AND-gates, a number n of electronic counters, a comparator, a number n of electronic switches and a number n of relays, as well as a sensor detecting the number of revolutions of a drive element, and a reference or set value transmitter. When reaching a fixed number of revolutions inputted into the reference value transmitter, and thus, a distinct length of yarn or the like, the related winding or spinning unit is stopped by the relay associated therewith.

5 Claims, 1 Drawing Figure

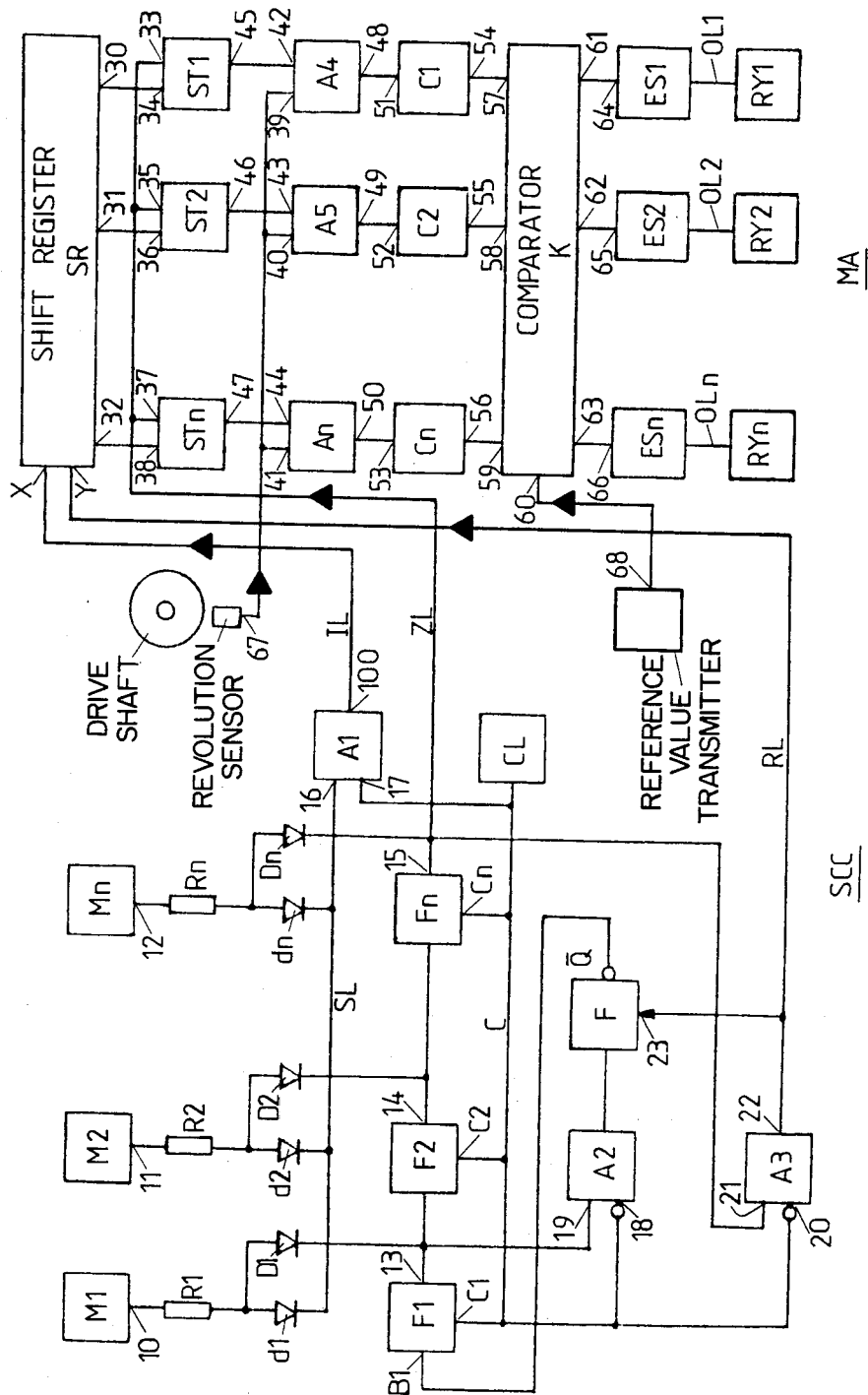

APPARATUS FOR MEASURING THE LENGTH OF FILAMENTARY MATERIAL, SUCH AS YARN OR THREAD WOUND-UP AT INDIVIDUAL WINDING OR SPINNING LOCATIONS OF A TEXTILE MACHINE

CROSS-REFERENCE TO RELATED APPLICATION

This application is related to my commonly assigned, copending U.S. patent application Ser. No. 06/470,591, filed Feb. 28, 1983 U.S. Pat. No. 4,512,028, entitled "Electronic Scanner for Monitoring Running Threads at a Multitude of Locations in a Textile Machine".

BACKGROUND OF THE INVENTION

The present invention relates to a new and improved apparatus for measuring the length of filamentary material, such as a yarn or thread or the like, wound-up at individual locations or stations in a textile machine.

In its more specific aspects, the present invention relates to a new and improved apparatus for measuring the length of filamentary material, such as a yarn or thread or the like, wound up at a number n of individual locations or stations, especially at winding or spinning locations, of a textile machine, which apparatus cooperates with an electronic scanner or interrogation device delivering signals on output lines thereof, namely for each individual winding or spinning location or station a thread running signal, and a reset signal and a read-in signal at the end of each scanning or interrogation cycle.

An electronic scanning or interrogation circuit for monitoring a multitude of running thread locations in a textile machine is described in my aforementioned copending U.S. application Ser. No. 06/470,591, filed Feb. 28, 1983 Pat. No. 4,512,028, and entitled "Electronic Scanner for Monitoring Running Threads at a Multitude of Locations in a Textile Machine". By means of such scanning or interrogation circuit thread ruptures occurring at individual thread running locations or stations of a textile machine can be detected and counted.

In many cases, for example, in automatic winding machines or open-end spinning machines, it is desired to produce yarn or thread packages which always have a constant yarn or thread length. Length cutting devices suitable for this purpose are known, and by means thereof each thread running location and winding location or spinning location is stopped or brought to standstill after the passage of a distinct length of yarn. A particularly simple technique of measuring the length is based upon counting the revolutions of a drum or guide disk about which the yarn is supplied to a wind-up spool as known, for example, from Swiss Pat. No. 568,233, German Pat. No. 2,351,463 and British Pat. No. 1,480,398. The yarn length for each revolution of the drum or disk then results as a function of the diameter thereof.

SUMMARY OF THE INVENTION

Therefore, with the foregoing in mind, it is a primary object of the present invention to provide a new and improved apparatus for continuously reliably and accurately measuring the length of filamentary material, such as a yarn or thread, wound-up at individual locations or stations in a textile machine containing a number of synchronously driven yarn or thread running locations, for example, in an automatic winding machine or spinning machine.

Another important object of the present invention is directed to the provision of a new and improved apparatus for measuring the length of filamentary material, such as yarn or thread, wound-up in a textile machine containing a number of synchronously driven yarn or thread running locations, for example, in an automatic winding machine or spinning machine, in which the length of the yarn or thread wound-up at each yarn or thread running location is continuously determined in an extremely reliable manner.

Still a further significant object of the present invention is directed to a new and improved construction of an apparatus for measuring the length of filamentary material, such as yarn or thread, wound-up in a textile machine containing a number of synchronously driven yarn or thread running locations, for example, in an automatic winding or spinning machine, by means of which the winding or spinning operation is stopped at a given location when a predetermined length of yarn is obtained or wound-up.

Now in order to implement these and still further objects of the invention, which will become more readily apparent as the description proceeds, the apparatus of the present development is manifested by the features that, there is provided a shift register having a number n of parallel outputs and two inputs. These inputs are respectively connected to an output line for conducting a number n of thread running signals and to an output line for conducting reset signals. There is also provided a number n of storage members each having two inputs, a first of which is connected to a read-in line and a second of which is connected to a respective one of the number n of parallel outputs of the register. There is also provided a number n of AND-gates each having two inputs, the first one of which is connected to a revolution sensor indicating the number of revolutions of a driving shaft common to all winding or spinning locations, and the second of which is connected to the related storage member. There is further provided a number n of electronic counters, each of which is connected to an associated AND-gate, and a comparator having a reference or set value input connected to a reference or set value transmitter. The comparator also has a number n of measuring inputs, each of which is connected to a respective one of the electronic counters. Finally, there is provided a number n of relays, each of which is operable by means of a respective electronic switch connected to the comparator.

BRIEF DESCRIPTION OF THE DRAWING

The invention will be better understood and objects other than those set forth above, will become apparent when consideration is given to the following detailed description thereof. Such description makes reference to the annexed drawing wherein the single Figure shows a schematic block circuit diagram of an exemplary embodiment of measuring apparatus constructed according to the invention.

DETAILED DESCRIPTION OF THE PREFERRED EMBODIMENTS

Describing now the drawing, it is to be understood that only enough of the construction of the measuring apparatus has been shown as needed for those skilled in the art to readily understand the underlying principles and concepts of the present development, while simplifying the showing of the drawing. In the context of this disclosure there will be typically used the term "yarn" or "thread" as representative of filamentary material which can be measured with the apparatus of the present development. Each such term "yarn" or "thread" as used herein is to be understood as employed in its broadest possible sense as encompassing yarns, threads or other similar types of filamentary material, the length of which can be measured with the inventive apparatus. Turning attention now specifically to the single Figure of the drawing, there has been shown therein a schematic block circuit diagram depicting a scanning or interrogation circuit in the left-hand part and in the right-hand part the measuring apparatus or circuit for measuring the length of yarn or thread or the like wound-up at the individual winding or spinning locations.

To the standard equipment for a winding machine or an open-end spinning machine there belongs a number n of measuring heads, of which in the present case three measuring heads M1, M2 and Mn are conveniently shown by way of example. The measuring heads M1, M2 and Mn serve to monitor the yarn or thread travel or run at the winding or spinning locations or stations. Each measuring head M1, M2 and Mn generates a thread travel or running signal as long as the associated thread or the like runs. The thread running signal may be assumed to have a positive value when the thread is running and to disappear when the thread ruptures or is stopped or comes to a standstill. By performing a limiting operation the thread running signal is transformed into a binary signal having either a value H or a value L. For example, the value H may be assumed to be 5 volts and the value L may be assumed to be null volts.

A scanning or interrogation circuit SCC is connected to the measuring heads M1, M2 and Mn. Such scanning apparatus is described in detail in my aforementioned copending U.S. application Ser. No. 06/470,591, filed Feb. 28, 1983 U.S. Pat. No. 4,512,028 and entitled "Electronic Scanner for Monitoring Running Threads at a Multitude of Locations in a Textile Machine". In the scanner or interrogation circuit SCC there is connected in parallel to the measuring heads M1, M2 and Mn a series connection or series circuit of n bistable flip-flops or controllers F1, F2 and Fn. The outputs 10, 11 and 12 of the measuring heads M1, M2, Mn are connected via respective resistors R1, R2 and Rn and first diodes d1, d2 and dn to a common signal line SL and; additionally, via the aforementioned resistors R1, R2 and Rn and respective second diodes D1, D2 and Dn to the outputs 13, 14 and 15 of the related bistable flip-flops F1, F2 and Fn.

For scanning or interrogating the individual measuring heads M1, M2 and Mn a clock pulse generator CL is provided which controls the clock pulse inputs C1, C2 and Cn of the bistable flip-flops F1, F2 and Fn via a clock pulse line C. Preferably, the clock pulse generator CL supplies pulses at a high repetition frequency in the range of a number of kHz like, for example, 10 kHz. However, the scanning or interrogation operation also may be accomplished at a very low frequency like, for example, 10 Hz.

The final or terminating stage of the scanning or interrogation circuit is formed by a first AND-gate or circuit A1 including two inputs 16, 17 and an output 100. The first input 16 is connected to the signal line SL and the second input 17 is connected to the clock pulse line C. The first output line or indicating line from the scanner circuit SCC extends from the output 100 of the first AND-gate and is designated by reference character IL.

A second AND-gate or circuit A2 including a negated first input 18 and a further bistable flip-flop or controller F having a negated output $\overline{Q}$ connected in series to the AND-gate A2 form an initiating or start circuit. Furthermore, a third AND-gate or circuit A3 including a negated first input 20 and an output 21 is provided for reset purposes.

The negated first inputs 18 and 20 of the second and third AND-gates A2 and A3, respectively, are connected to the clock pulse line C. The respective second inputs 19 and 21 of the AND-gates A2 and A3 are connected to the respective outputs 13 and 15 of the first and last in the series of bistable flip-flops F1 and Fn, respectively. The negated output $\overline{Q}$ of the further bistable flip-flop F controls the data input B1 of the bistable flip-flop F1 which is the first in the series. The output 22 of the third or reset AND-gate A3 is connected to the reset input 23 of the further bistable flip-flop F. The second output line or reset line from the scanner circuit SCC extends from the output 22 of the third AND-gate A3 and is designated by reference character RL.

The measuring apparatus MA for measuring the length of the yarn or thread wound-up at the winding or spinning locations or stations comprises a revolution sensor RS having an output 67 and cooperating with a drive shaft DS which is common to all winding or spinning locations, a shift register SR including a number n of parallel outputs 30, 31, 32, a number n of storage members ST1, ST2 and STn, a number n of AND-gates A4, A5 and An, a number n of electronic counters C1, C2 and Cn, a reference or set value transmitter RT having an output 68 and connected with a comparator K, a number n of electronic switches ES1, ES2 and ESn, and a number n of relays RY1, RY2 and RYn. Output lines OL1, OL2 and OLn interconnect the electronic switches ES1, ES2, ESn to a respective one of the relays RY1, RY2 and RYn.

The shift register SR has a data input X and a reset input Y. The data input X is connected to the indicating line IL of the scanner or interrogation circuit SCC, and the reset input Y is connected to the reset line RL. Each one of the number n of storage members ST1, ST2 and STn has two inputs. The first inputs 33, 35, 37 are connected to the output 15 of the last bistable flip-flop or controller Fn in the series via a third output line or read-in line ZL from the scanner circuit SCC, and the second inputs 34, 36, 38 are connected to a respective output 30, 31 and 32 of the shift register SR. Each of the AND-gates or circuits A4, A5 and An has a respective first input 39, 40 and 41 and a respective second input 42, 43 and 44. The first inputs 39, 40 and 41 are connected to the output 67 of the revolution sensor RS, and the second inputs 42, 43 and 44 are connected to the outputs 45, 46 and 47 of the respectively associated storage members ST1, ST2 and STn.

Each of the AND-gates or circuits A4, A5 and An has a respective output 48, 49 and 50 which is connected to the inputs 51, 52 and 53 of the electronic counters C1, C2 and Cn, respectively. The respective outputs 54, 55 and 56 of the electronic counters C1, C2 and Cn are connected to a number n of respective measuring inputs 57, 58 and 59 of the comparator K. The comparator K has a reference or set value input 60 which is connected to the output 68 of reference or set value transmitter RT. Each of the number n of outputs 61, 62 and 63 of the comparator K is connected to a respective input 64, 65 and 66 of the electronic switches ES1, ES2 and ESn which are connected in the related circuit of a respectively associated relay RY1, RY2 and RYn by means of the associated output lines OL1, OL2 and OLn.

The function and operation of the measuring apparatus MA is as follows in event that a thread or the like runs at least at part of the number of measuring heads M1, M2 and Mn.

During a scanning or interrogation cycle at the measuring heads M1, M2 and Mn and at the bistable flip-flops F1, F2 and Fn, respectively, a sequence of a number n of binary or logic signals (1) or (0) is read into the shift register SR in reverse sequence. Of these signals the logic (1)-signals each indicate a travelling or running thread at the respective measuring head M1, M2 and Mn. At the end of the scanning or interrogation cycle a pulse appears at the third output or read-in line ZL by means of which those of the storage members ST1, ST2 and STn are set to (1) at which a logic (1)-signal is present from the respective output 30, 31 and 32 of the shift register SR.

The AND-gates or circuits A4, A5 and An then will transmit a pulse to a respective one of the electronic counters C1, C2 and Cn for each revolution of the drive shaft DS at which the associated storage member ST1, ST2 and STn indicates a running thread. Thus the level of each one of the electronic counters C1, C2 and Cn indicates at any time the number of revolutions of the drive shaft DS as long as the associated thread is running. The comparator K compares the level of each one of the electronic counters C1, C2 and Cn with a predetermined value like, for example 100,000, at which the reference or set value transmitter RT is set or adjusted. As soon as this reference or set value is reached in any one of the counters C1, C2 and Cn, the related one of the relays RY1, RY2 and RYn is operated by means of the associated electronic switch ES1, ES2 and ESn. The relevant thread running location is thus stopped or brought to standstill at the corresponding measuring head M1, M2 and Mn and the exchange of the relevant completed bobbin package for an empty spool is initiated.

Furthermore a data processing unit can be connected to the apparatus as described hereinbefore which records or registers at which time and at which thread running location a bobbin package had to be exchanged.

With the exception of the revolution sensor RS and the relays RY1, RY2 and RYn, the measuring apparatus MA can be realized by a microprocessor having the input lines L, X and Y and the output lines OL1, OL2 and OLn.

While there are shown and described present preferred embodiments of the invention, it is to be distinctly understood that the invention is not limited thereto, but may be otherwise variously embodied and practiced within the scope of the following claims. Accordingly,

What I claim is:

1. An apparatus for measuring the length of filamentary material, such as yarn or thread, wound-up at a number n of individual locations, especially at winding or spinning locations, in a textile machine including a drive shaft common to all said locations, said apparatus being capable of cooperating with an electronic scanner operating in scanning cycles and including a first output line for a thread running signal, a second output line for a reset signal and a third output line for a read-in signal for each one of said number n of said locations, said reset signal and said read-in signal being supplied at the end of each of said scanning cycles, comprising:

a shift register including a number n of parallel outputs and two inputs, one of said two inputs being connected to said first output line conducting said thread running signal and the other one of said two inputs being connected to said second output line conducting said reset signal;

a number n of storage members each having two inputs and an output, a first one of said two inputs being connected to said third output line conducting said read-in signal and a second one of said two inputs being connected to a respective one of said number n of parallel outputs of said shift register;

a revolution sensor having an output and generating at said output a signal indicative of one revolution of said common drive shaft;

a number n of AND-gates each having two inputs and an output, a first one of said two inputs being connected to said output of said revolution sensor and a second one of said two inputs being connected to said output of a respective one of said number n of said storage members;

a number n of electronic counters each having an input and an output, said input being connected to said output of a respective one of said number n of said AND-gates;

a reference value transmitter having an output and generating at said output a signal indicative of a reference value of a predetermined number of revolutions of said common drive shaft;

a comparator having a number n of measuring inputs, a number n of outputs and a reference signal input connected to said output of said reference value transmitter, each of said number n of measuring inputs being connected to said output of a respective one of said number n of counters;

a number n of electronic switches each having an input and an output, each said input being connected to a respective one of said number n of said outputs of said comparator;

a number n of relays each having an input, said input being connected to said output of a respective one of said electronic switches; and each of said relays being activated by said ! comparator via each said respective electronic switch connected thereto.

2. The apparatus as defined in claim 1, wherein: each said relay is connected to operate upon a respective one of said number n of said locations of said textile machine when activated by a respective one of said electronic switches.

3. The apparatus as defined in claim 1, wherein: a microprocessor incorporating the components of said apparatus with the exception of the reference value transmitter and said relays is provided.

4. A control apparatus for controlling the length of filamentary material, such as yarn or thread, wound-up at a number n of individual locations, especially at winding or spinning locations, in a textile machine including a drive shaft common to all said locations, said control apparatus comprising:

an electronic scanning circuit operating in scanning cycles;

said scanning circuit including a plurality of measuring heads each of which is located at a respective one of said locations;
said scanning circuit further including:
   means for generating a thread running signal at a first output line of said scanning circuit;
   means for scanning said measuring cycle and for generating a reset signal at a second output line of said scanning circuit; and
   means for generating a read-in signal at a third output line of said scanning circuit;
length measuring means operatively connected to said electronic scanning circuit and including:
   a shift register including a number n of parallel outputs and two inputs, one of said two inputs being connected to said first output line conducting said thread running signal and the other one of said two inputs being connected to said second output line conducting said reset signal;
   a number n of storage members each having two inputs and an output, a first one of said two inputs being connected to said third output line conducting said read-in signal and a second one of said two inputs being connected to a respective one of said number n of parallel outputs of said shift register;
   a revolution sensor having an output and generating at said output a signal indicative of one revolution of said common drive shaft;
   a number n of AND-gates each having two inputs and an output, a first one of said two inputs being connected to said output of said revolution sensor and a second one of said two inputs being connected to said output of a respective one of said number n of said storage members;
   a number n of electronic counters each having an input and an output, said input being connected to said output of a respective one of said number n of said AND-gates;
   a reference value transmitter having an output and generating at said output a signal indicative of a reference value of a predetermined number of revolutions of said common drive shaft;
   a comparator having a number n of measuring inputs, a number n of outputs and a reference signal input connected to said output of said reference value transmitter, each of said number n of measuring inputs being connected to said output of a respective one of said number n of counters;
   a number n of electronic switches each having an input and an output, each said input being connected to a respective one of said number n of said outputs of said comparator;
   a number n of relays each having an input, said input being connected to said output of a respective one of said electronic switches; and
   each of said relays being activated by said comparator via each said respective electronic switch connected thereto.

5. The control apparatus as defined in claim 4, wherein:
   each said relay is connected to operate upon a respective one of said number n of said locations when activated by a respective one of said electronic switches.

* * * * *